United States Patent
Sutter

(10) Patent No.: US 11,465,847 B2
(45) Date of Patent: Oct. 11, 2022

(54) METHOD FOR ORDER-PICKING GOODS AND ORDER-PICKING SYSTEM FOR CARRYING OUT THE METHOD

(71) Applicant: FERAG AG, Hinwil (CH)

(72) Inventor: Stefan Sutter, Hombrechtikon (CH)

(73) Assignee: FERAG AG, Hinwil (CH)

(*) Notice: Subject to any disclaimer, the term of this patent is extended or adjusted under 35 U.S.C. 154(b) by 471 days.

(21) Appl. No.: 16/491,484

(22) PCT Filed: Jan. 10, 2018

(86) PCT No.: PCT/EP2018/050579
§ 371 (c)(1),
(2) Date: Sep. 5, 2019

(87) PCT Pub. No.: WO2018/162123
PCT Pub. Date: Sep. 13, 2018

(65) Prior Publication Data
US 2020/0189846 A1 Jun. 18, 2020

(30) Foreign Application Priority Data
Mar. 7, 2017 (CH) .................... 00277/17

(51) Int. Cl.
*B65G 1/137* (2006.01)
*B65G 17/20* (2006.01)
(Continued)

(52) U.S. Cl.
CPC ......... *B65G 1/1376* (2013.01); *B65G 1/1378* (2013.01); *B65G 17/20* (2013.01);
(Continued)

(58) Field of Classification Search
CPC ...... B65G 17/20; B65G 47/61; B65G 1/1376; B65G 47/08; B65G 47/905; B65G 2201/0238; B65G 2209/02
See application file for complete search history.

(56) References Cited

U.S. PATENT DOCUMENTS 8,490,774 B2* 7/2013 Janzen .................. B65G 9/002
53/251
2014/0195032 A1 7/2014 Horn et al.
(Continued)

FOREIGN PATENT DOCUMENTS

| CN | 202296069 U | 7/2012 |
| CN | 103029980 A | 4/2013 |
(Continued)

OTHER PUBLICATIONS

China Patent Office, "Notice of First Office Action," for Chinese Patent Application 201880016601.8, dated Sep. 28, 2020, Beijing, China (38 pages).

*Primary Examiner* — Thomas Randazzo
(74) *Attorney, Agent, or Firm* — Pauley Erickson & Swanson

(57) ABSTRACT

A method for order-picking goods in which individual goods are removed from store from a goods collection, are combined in accordance with stipulations to form goods groups and, in the form of these goods groups, are output for further processing. A simple and flexible type of order picking is achieved in that the combining of goods to form goods groups is carried out in pockets suspended on a suspension conveyor.

30 Claims, 9 Drawing Sheets

(51) Int. Cl.
    *B65G 47/08*     (2006.01)
    *B65G 47/90*     (2006.01)
    *B65G 47/61*     (2006.01)

(52) U.S. Cl.
    CPC ............. *B65G 47/08* (2013.01); *B65G 47/61* (2013.01); *B65G 47/905* (2013.01); *B65G 2201/0238* (2013.01); *B65G 2209/02* (2013.01)

(56) References Cited

U.S. PATENT DOCUMENTS

| | | | | |
|---|---|---|---|---|
| 2015/0225177 | A1* | 8/2015 | Schonenberger | B65G 17/485 383/17 |
| 2017/0088302 | A1* | 3/2017 | Auf Der Maur | B65G 9/004 |
| 2017/0369250 | A1* | 12/2017 | Fenile | B65G 47/44 |
| 2018/0002115 | A1* | 1/2018 | Fenile | B65G 47/61 |
| 2018/0244473 | A1* | 8/2018 | Mathi | B65G 47/905 |
| 2018/0312341 | A1* | 11/2018 | Keller | B65G 9/004 |

FOREIGN PATENT DOCUMENTS

| | | | |
|---|---|---|---|
| CN | 103910159 A | 7/2014 | |
| CN | 204161923 U | 2/2015 | |
| DE | 100 39 394 C1 | 9/2001 | |
| DE | 10 2012 018 925 A1 | 3/2014 | |
| DE | 21 2014 000 008 U1 | 6/2015 | |
| DE | 3090967 A2 * | 11/2016 | ............ B65G 17/20 |
| EP | 1 799 594 A1 | 6/2007 | |
| EP | 2 196 415 A2 | 6/2010 | |
| EP | 2 581 329 A1 | 4/2013 | |
| EP | 2 714 552 A1 | 4/2014 | |
| EP | 2 789 555 A1 | 10/2014 | |
| JP | H0958860 A * | 8/1995 | ............ B65G 47/61 |
| JP | H07 304514 A | 11/1995 | |
| JP | H0958705 A * | 3/1997 | ............ B65G 47/61 |
| JP | 2001-253515 A | 9/2001 | |
| JP | 2001-261127 A | 9/2001 | |
| JP | 2002-249209 A | 9/2002 | |
| WO | WO2006/029433 A1 | 3/2006 | |
| WO | WO 2012/163780 A1 | 12/2012 | |
| WO | WO 2013/029192 | 3/2013 | |
| WO | WO 2013/053747 | 4/2013 | |
| WO | WO 2015/124524 A1 | 8/2015 | |
| WO | WO 2016/030273 A1 | 3/2016 | |
| WO | WO 2016/030274 A1 | 3/2016 | |
| WO | WO 2016/030275 A1 | 3/2016 | |
| WO | WO 2016/066578 A1 | 5/2016 | |
| WO | WO 2016/120030 A1 | 8/2016 | |
| WO | WO 2016/120031 A1 | 8/2016 | |
| WO | WO 2016/197176 A1 | 12/2016 | |
| WO | WO 2017/027897 | 2/2017 | |

* cited by examiner

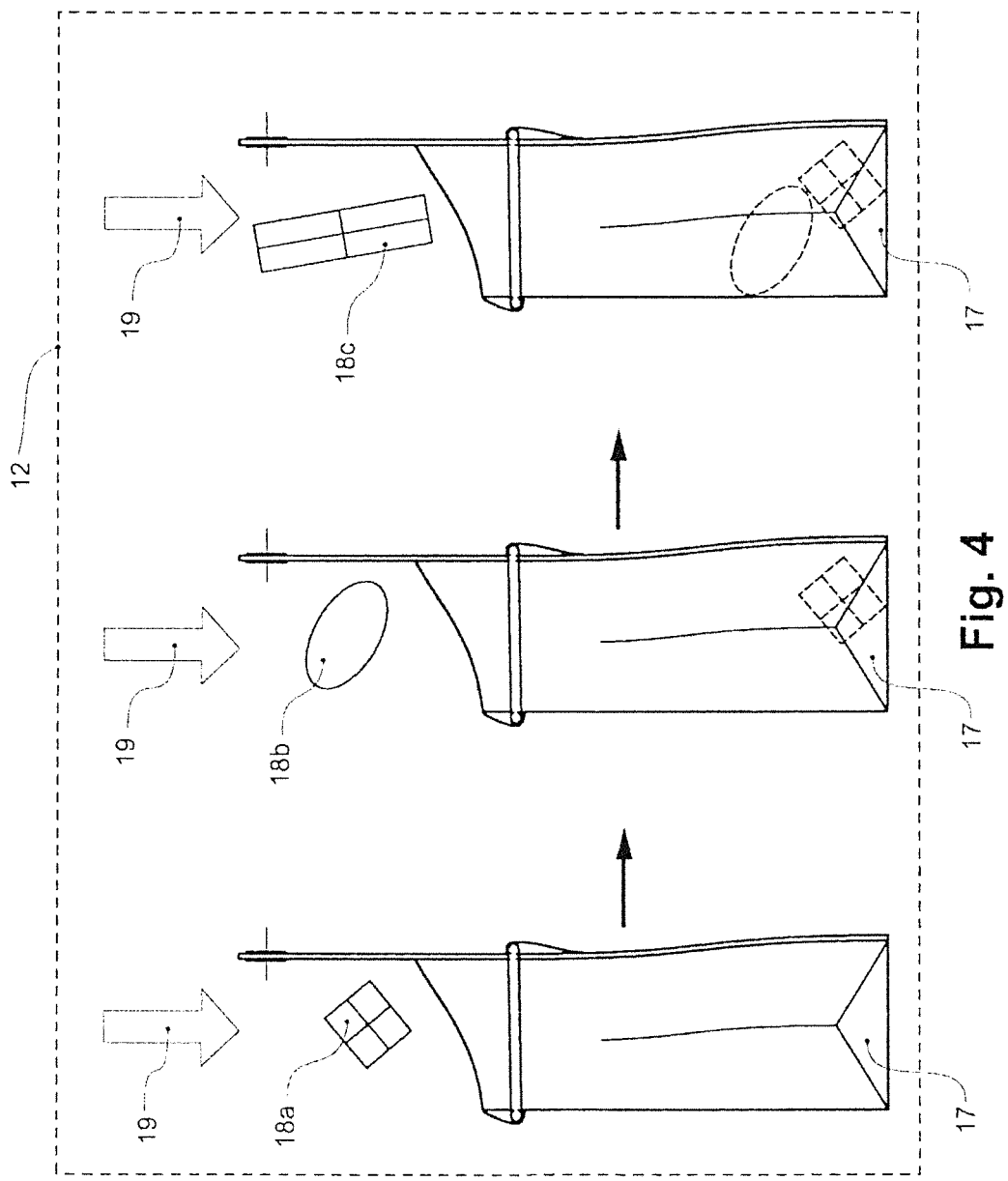

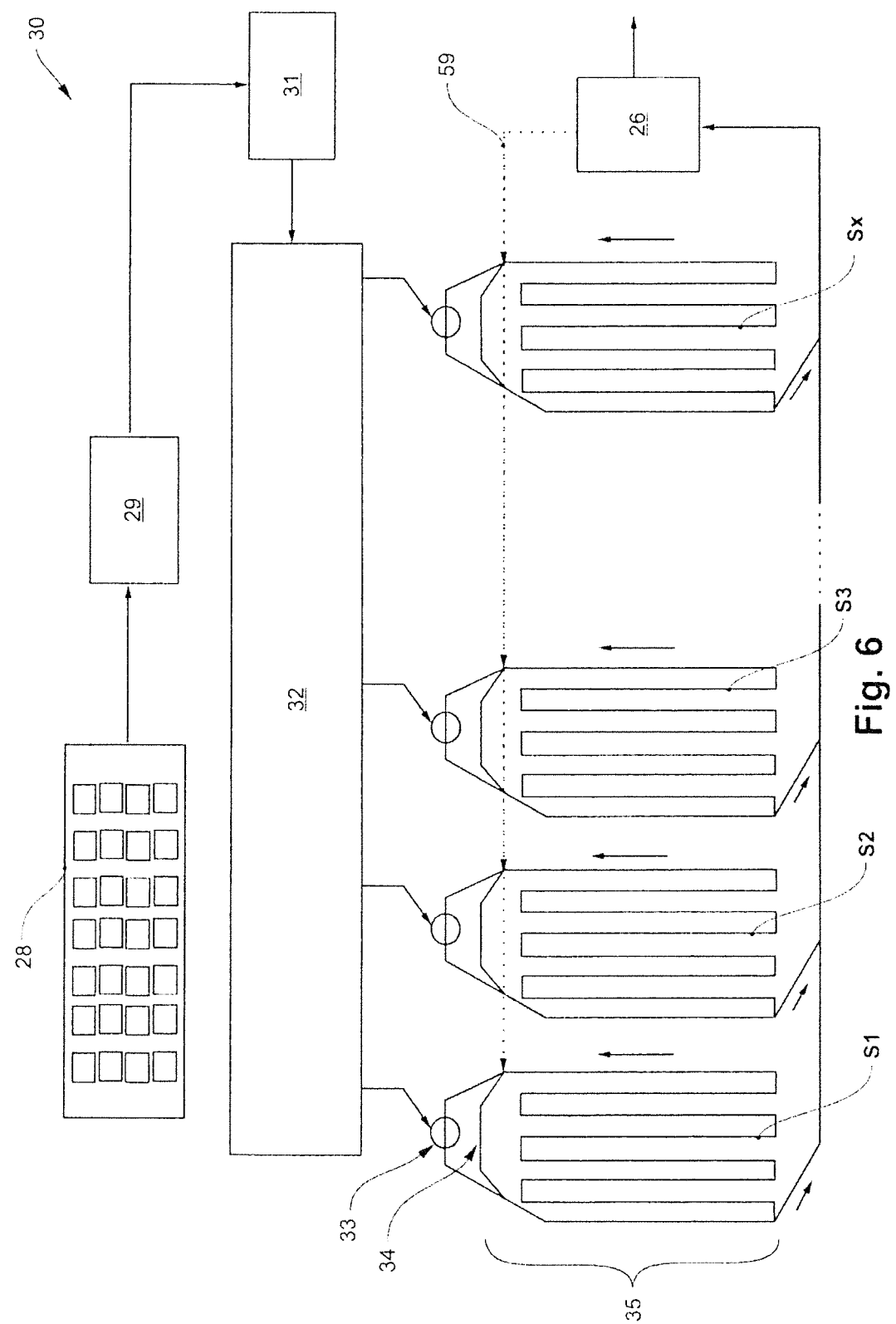

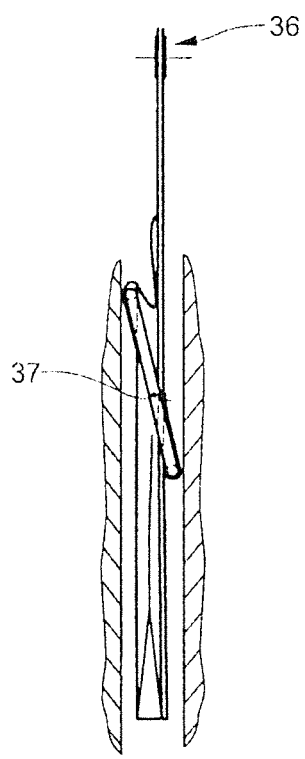 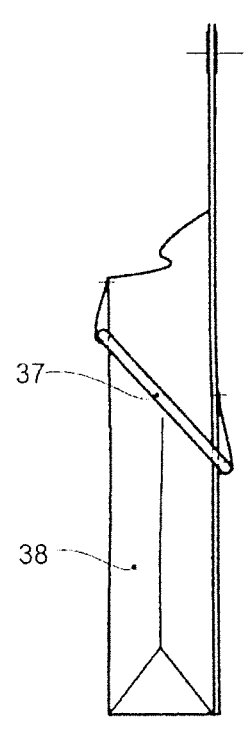 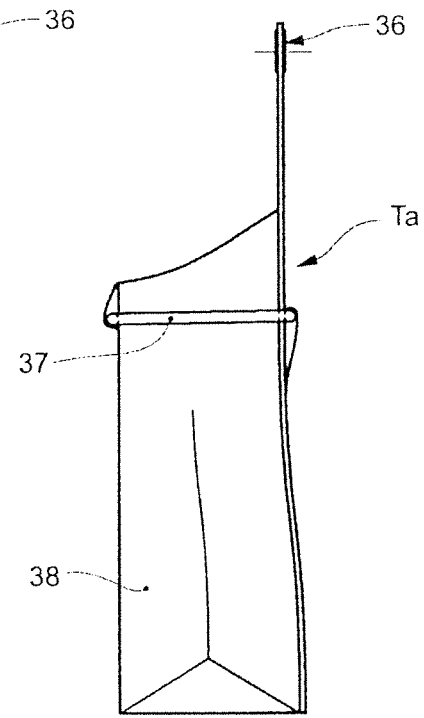
Fig. 7a  Fig. 7b  Fig. 7c
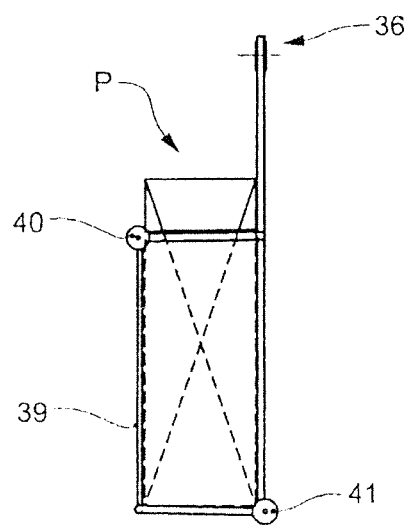 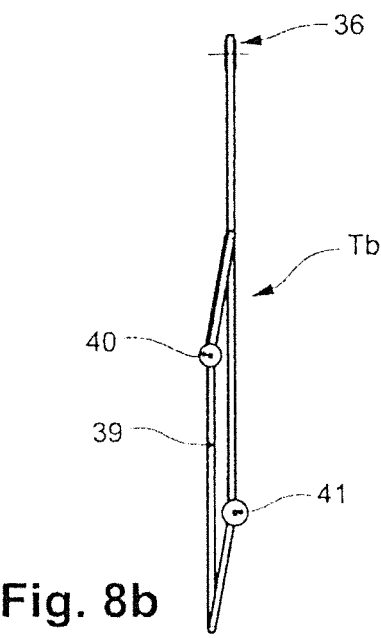
Fig. 8a  Fig. 8b

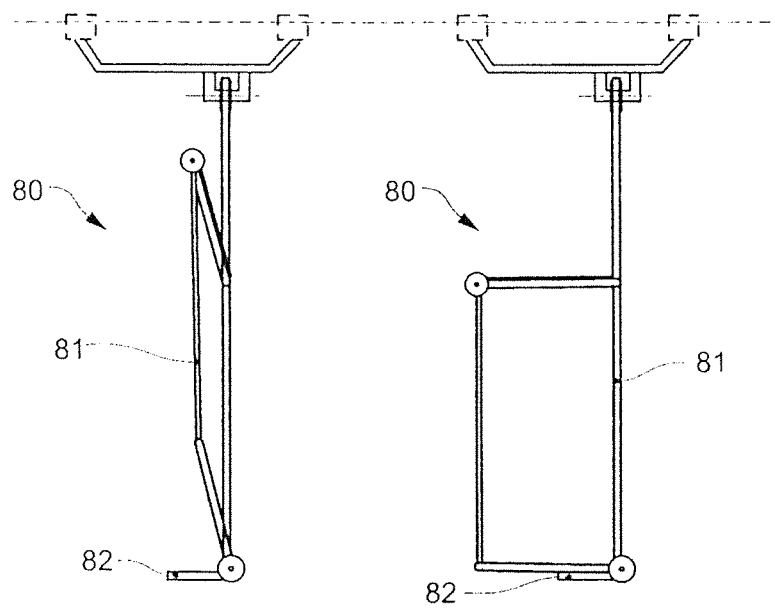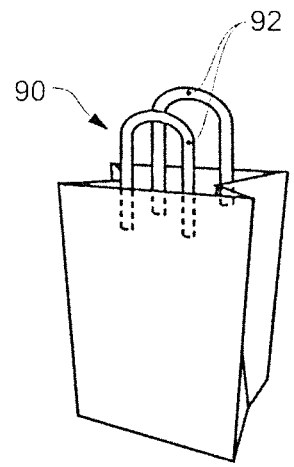
Fig. 11a    Fig. 11b    Fig. 12
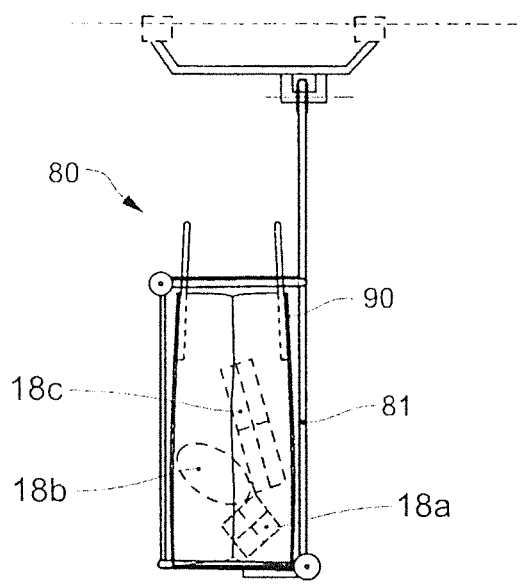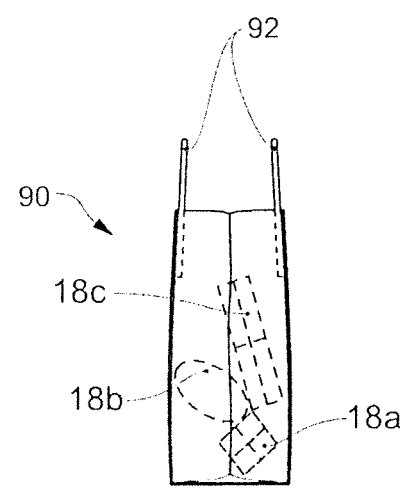
Fig. 13    Fig. 14

METHOD FOR ORDER-PICKING GOODS AND ORDER-PICKING SYSTEM FOR CARRYING OUT THE METHOD

BACKGROUND OF THE INVENTION

Field of the Invention

The present invention relates to the field of distribution of items and articles. It relates to a method for order-picking items according to the preamble of claim 1. It further relates to an order-picking facility for carrying out the method.

Discussion of Related Art

In the context of the increasing flow of items and the changing manner of item distribution and supply, logistical problems and solutions have become increasingly widespread. Items stored and held in large storages, in particular also in high-bay storages, should be removed at a time as near as possible to the order, assembled to form consignments of items and dispatched. An important partial field of this item handling is order-picking, i.e., the gathering of specific partial quantities (articles) from a provided overall quantity (article range) based on orders. This may be a customer order or a production order.

There are a many proposals in the prior art for solutions to the problems found in order-picking.

Document EP1799594B1 describes a method for picking customer orders in order to provide products in the desired number, including the following steps: the assignment of each customer order to at least one order storage container, retrieving the products given in the customer order in the predetermined number from a main storage and sorting the retrieved products into the at least one order storage container assigned to the customer order and—for each customer order—transferring the products which have been temporarily stored in the at least one order storage container assigned to the customer order to a collection conveyor at a time determined for the customer order. In order to retrieve the products from the main store, retrieval instructions are produced for order-pickers, wherein a retrieval instruction includes the products to be retrieved and their number, wherein it is possible to combine the products of several customer orders which are retrieved together from the main storage and then sorted into the associated order storage containers according to the customer orders.

Document DE212014000008U1 discloses an order-picking facility having a controlling computer for picking products for a picking order, wherein the order-picking facility comprises at least one rack unit having two racks for storing products and a transport system provided in a rack lane formed by the two racks for storing and collecting the products, and wherein products that are collected from the racks may be transferred to a temporary storage space, and wherein a conveyor system is provided to convey the products. At least two buffer jackets are provided as a temporary storage space and the controlling computer is configured to pick partial picking orders of the products of a picking order contained in the racks of a rack unit into one of the buffer jackets, respectively, and the controlling computer is configured to bring the partial picking orders of a picking order together on the conveyor system.

Document WO2013053747A1 discloses an order-picking facility with an article storage, a conveying system for storage load support means, a load carrier conveying system, a pick station which is connected to the article storage and which is coupled to the load carrier conveying system, wherein the pick station comprises a first monitoring device and a second monitoring device, wherein the first monitoring device is arranged such that a manual removal of an article from a storage load support means can be detected, and wherein the second monitoring device is arranged such that a manual transfer of the article removed into precisely one of the load carriers can be determined, wherein the removal position and the transfer position are arranged within an operating region of the pick station; and with a controlling device adapted to transport storage load support means for batch picking to the pick station and to track a number of article removals in order to effect replacement of a storage load support means at the removal position when a number of articles predetermined by the batch picking has been removed, and in order to effect a load carrier replacement at the transfer position when the transfer of the removed article into the load carrier provided has been determined. The load carrier conveyor system may be a hanging conveyor system and the load carriers may be bags.

Document EP2789555B1 discloses a device for the order-based provision of individual items for a plurality of orders from an items storage, which device includes at least one temporary storage, connected to an items storage, for temporarily storing individual items of at least one order, and a respective collection area connected to the at least one temporary storage for collecting the individual items of the at least one completed order and a separation area comprising a plurality of transfer lines for the order-based provision of the individual items of the at least one completed order.

Document WO2013/029192A1 discloses a method for providing groups of products by means of a conveyor system, wherein the products are present in a plurality of different types and a plurality of different variants and wherein a group of products comprises a plurality of products, and which method comprises the following steps:— feeding an input section of the system with input groups, wherein an input group includes a plurality of products of the same type;—receiving a plurality of machine-readable output group requirements, wherein an output group requirement specifies a composition of an output group by indicating the type and variant for a plurality of products, wherein the products are preferably all of the same variant;—conveying the products from the input section into a transfer section of the system;—conveying the products from the transfer section into an output section of the system;—wherein after the conveying of the products into the transfer section and into the output section, output groups of the products in accordance with the output group requirements are present in the output section;—outputting the output groups from the output section.

Document WO2015124524A1 describes a hanging conveyor device for transporting conveyed goods in hanging bags, including a plurality of hanging bags, each having a first bag side wall and a second bag side wall, which in a folding connection region are interconnected so that they can be folded apart and folded together to open and close a conveyed goods receiving space, and including an suspension means for suspending the hanging bag on the hanging conveyor device, wherein the first bag side wall is connected to the suspension means pivotably about a bag pivot axis that extends, in a transport position of the hanging bag, at least substantially horizontally, and the second bag side wall is connected to the suspension means or can be acted upon thereby in a way that, by pivoting the first bag side wall about the bag pivot axis, the bag side walls can be folded apart and folded together, wherein the hanging conveyor device further includes: a guide rail arrangement for guided movement of the hanging bags in the transport position thereof, and a loading station for the hanging bags, comprising a loading platform positioned below the guide rail arrangement. The loading platform can be adjusted relative to the guide rail arrangement in a vertical direction, preferably moved automatically.

Proposed therein is a sorting procedure in which the hanging bags first transport articles of the same type which are then emptied at the unloading stations, from where the articles are supplied correctly sorted to the loading stations by means of a box conveying system, and from which loading station the now empty hanging bags can each be filled with a desired combination of articles, including combinations with other articles. The individual hanging bags can thereby be clearly identified by means of automatically readable identifiers that have been applied thereto.

Document WO2016066578A1 discloses a method and a storage and order-picking system for progressive order-picking in accordance with new orders, wherein the system comprises: a picking storage, in which different types of articles are stored, wherein the storage comprises a capacity ensuring a picking range of many days; a picking station for articles stored in the storage; a buffer storage in which selected article types are stored and which has a capacity ensuring a range of a few days, wherein a filling order is newly determined cyclically based on data of older orders, wherein the older orders indicate ordered article types including their numbers and order times; an order-picking controller; and at least one working station and a consolidation buffer device, wherein the order-picking controller is configured for cyclical production of the filling order, wherein the production includes the following steps: selecting, for the buffer storage based on the data of the older orders, the article types which have been frequently ordered in larger quantities in the past; determining the number of buffer articles for each of the selected article types; and producing the filling order which defines the article types and their respective number of buffer articles.

Document WO2016197176A1 discloses a method for order-picking items in a picking zone, including the steps of—providing items, providing at least one sack and a case-like loading support means, introducing the at least one sack into the case-like loading support means,—filling the at least one sack with the items in the order-picking zone and transporting the case-like loading support means with the filled sack away from the order-picking zone, whereby, before the at least one sack is filled with the items, a picking support is introduced into the at least one sack.

All the known methods and devices for order-picking items are comparatively complex, inflexible and can be adapted to different conditions only with considerable effort.

SUMMARY OF THE INVENTION

An object of the invention therefore is to provide a method for order-picking and an order-picking facility for carrying out the method which avoids the disadvantages of known methods and facilities, is simply constructed, easily expandable or otherwise adaptable and can be operated flexibly.

The object is achieved by the features of claims 1 and 16.

The method according to the invention for order-picking items, whereby the individual items are removed from an items collection, combined into groups of items in accordance with specifications and output in the form of these groups of items for further processing, is characterized in that the combination of the items into groups of items is effected into pouches suspended on a hanging conveyor.

The collection of items may be ordered, for example when the items are prepared in a sorted state in accordance with their type on pallets or in a rack or high-bay storage. The collection of items may, however, also be disorderly when the items are loose in a container or are heaped in a pile, which may particularly be the case with compact, smaller articles.

In particular, at least one pouch may thereby be assigned to each group of items. If the items of a picked group of items fit into a single pouch, they can be combined and placed into a single pouch. Particularly if the group of items is too large for a single pouch, however, it is conceivable to divide this group of items up over a plurality of assigned pouches which, according to their assignment to the picked group of items, should then be characterized as associated with each other or be identifiable as such. This can be carried out by arrangement in a direct sequence, one after the other, or by applying corresponding (readable) information items to the pouches. The assignment of items of the group of items and pouches can be carried out automatically by an appropriately configured controller.

Generally, a picked group of items includes a plurality of individual items which are usually different, but which may also be partially or completely of the same type. In an extreme case, the group of items may comprise a single item or a single article.

Further, at least one pouch is preferably filled with a group of items consisting of a plurality of items.

According to an embodiment of the method according to the invention, the groups of items can be placed in the pouches prepared for them in a single filling procedure. The group of items gathered by the order-picking is thereby held on stand-by and placed in the pouch assigned to it.

According to another embodiment of the method according to the invention, the items or articles which belong to a group of items can be placed in the pouch(es) provided for them with the group of items being formed in a plurality of successively carried out filling operations. The filling operations may thereby relate to single items or articles, but also to any other partial quantities of the picked group of items. If, for example, the group of items comprises five articles, in one filling operation three of the five articles and in another filling operation the remaining two articles can be introduced. This procedure is naturally also advantageous when the group of items must, as a result of its size, be divided among multiple pouches.

In particular, a specific filling operation can be carried out for each individual item.

For successive filling, the pouch may be guided past different filling devices one after the other. At each of these filling devices, individual articles of the group of items or also partial quantities of the group of items can be filled. After passing the plurality of filling devices, the pouch is ready to transfer the picked group of items to an items output.

For successive filling, however, the pouch may also be guided past the same filling device several times. In this case, the filling device prepares the items or articles or partial quantities which belong to the group of items one after the other. If several pouches circulate in this way past the same filling device, the filling device must assign the items or articles which are held prepared with the pouches that are just arriving. All these procedures can be carried out by a shared controller automatically.

In particular, the group of items may contain multiples of one item. Partial quantities of the same items or articles are then present in the group of items. In a special case, all the items of the group of items are the same.

According to another embodiment of the method according to the invention, after being filled with the prepared group of items, the pouches firstly may be temporarily stored before the groups of items contained therein are output for further processing. As a result of the temporary storage of the filled pouches, a storage function is realized that may serve to compensate between different rates of picking and items output. It is thus conceivable to carry out order-pickings overnight without output of the items, which order-pickings are then released for further processing on the next day or at a later date.

The intermediate storage has also been found advantageous for partially filled pouches where the filling with different items cannot be carried out in direct succession because, for example, one or more items from the provided group of items are not yet available.

In particular, the filled and/or the partially filled pouches can be temporarily stored in a circulating storage in which they circulate in a closed circuit. As a result of the circulation, the access times to a specific pouch filled with a picked group of items are reduced.

The access can be further improved when the filled pouches in the circulating store are divided up across different storage units based on content. It is thereby possible for a sorting function to be realized that stores the groups of items in accordance with the respective type at different locations and thus permits access not only based on content, but also based on the storage location.

When more than one pouch is required for a group of items, it was found advantageous to control the system in such a manner that the pouch group containing the group of items is transported spatially in direct succession, is stored where necessary, and is supplied to the emptying device.

The order-picking facility according to the invention for carrying out the method according to the invention is characterized in that the order-picking facility at the input side comprises an items collection for the items which are intended to be picked and at least one thereto connected filling device for the pouches, and, at the output side, an emptying device for the pouches that are filled with the groups of items, and in that between the at least one filling device and the emptying device there is arranged a hanging conveyor for the pouches which connects the at least one filling device to the emptying device.

The pouches are suspendedly transported in an empty, partially filled or filled state between the stations and suspendedly filled or emptied on the hanging conveyor at the stations. This may in particular be carried out with a running hanging conveyor without any periods of standing idle.

According to an embodiment of the invention, the hanging conveyor connects the at least one filling device to the emptying device in a closed circuit. In this closed circuit, the pouches circulate between the individual stations.

The hanging conveyor may thereby be guided past a plurality of filling devices arranged one behind the other. At these filling devices arranged one behind the other, an individual pouch can be filled several times. However, it is also conceivable for different pouches to be filled at different filling devices in parallel to some extent in order to increase the throughput.

However, the hanging conveyor may also comprise an additional closed circuit, on which partially filled pouches are returned again to the at least one filling device without being emptied at the emptying device. Using a minimum of filling devices, it is thereby also possible to solve more complex order-picking tasks.

According to an embodiment of the invention, a shared controller is provided for the controller of the filling device, emptying device and hanging conveyor.

The shared controller is configured in particular for the assignment of the items of a group of items to individual pouches. This assignment and the resultant filling are carried out automatically by the shared controller. Analogously, the shared controller controls the emptying of the pouches for planned further processing of the picked groups of items. The shared controller also ensures that the circuit of the partial filling with the remaining processes is adjusted without disruption, in particular the complete emptying of the pouches.

After the complete emptying of the pouches, which is preferably carried out at a station in one step, the pouches are available again for filling.

Furthermore, in order to transmit order-picking data, particularly data of the groups of items, the shared controller may be connected to an ERP system. Such an ERP system, generally tasked with Enterprise Resource Planning (ERP), ensures that, in the manner of material requirement planning, all items required for the order-picking are available at the correct location, at the correct time and in the right quantity. This particularly includes preparing the items in the items collection, collecting the items from the items collection (for example, a high-bay storage), monitoring and directing the controller and transmitting data to an items output which, if it concerns an items dispatch, may contain dispatch data such as an address, weight, postage, box size, etc.

The shared controller and the ERP system form a configuration which is distinguished by the following characteristics and features:

the shared controller has an interface to the ERP system having IT infrastructure/PC,
there is further included a storage administration system and a material flow controller for the storage administration system,
there is also included a coordination controller for a plurality of circulating hanging conveyors,
there is a database coupling,
there is further a web server for order tracking,
for user clearance, a log-in module is provided,
optionally using a back-up PC, a high level of availability can be achieved,
a plurality of articles can be assigned to an order/a pouch,
transfer of the completed orders to the transfer station,
all mechanical components of the system, such as drives, switches, stoppers, are controlled,
sensors for detecting the pouches and carriages for tracking the path of the groups of items are provided,
for the completed orders, confirmations are output.

The hanging conveyor may be configured as a circulating storage in which filled and/or partially filled and/or empty pouches can be temporarily stored. It is thereby possible for the operation of the system to be made increasingly flexible and the sequence of the order-picking can on the whole be accelerated. In addition, as a result of the temporary storage, the operation can per se be rapidly adapted to requirements which change in a short period of time, such as early or delayed deliveries of groups of items.

In particular, the circulating storage may comprise a plurality of storage units which can be approached individually one after the other and in which filled and/or partially filled pouches and/or empty pouches circulate in a separate circuit. As a result of the local division into individual storage units, the flexibility is additionally increased. It is thus conceivable, for example, to assign individual storage units to individual delivery times or dates and therefore to also spatially combine and retain deliveries that temporally belong together.

According to another embodiment of the invention, the order-picking facility includes at least one filling device which moves synchronously with the hanging conveyor which is guided past it underneath and fills items out of moving filling compartments into the pouches passing below. The movement may thereby be linear or also rotational. A uniform operation of the facility can thereby be realized very simply.

According to another embodiment of the invention, the emptying device includes a removal device which pivots the filled pouches suspended on the hanging conveyor into an emptying position and at the same time in the emptying position receives the items coming out of the pouches and transports them onward. In preferred embodiments, the pouches are completely emptied, preferably in one step.

In particular, the removal device may include a circulating removal belt which is guided over a predetermined path parallel to the hanging conveyor, on which path a transfer area is located for the items contained in the pouches.

According to other embodiments of the invention, the order-picking facility not only includes pouches, but baskets are also used to assemble the items into groups of items, exclusively or in combination with the pouches. The items are thereby preferably picked into a container, such as, for example, a bag or sack which is located in the basket suspended on the hanging conveyor. It will be understood by the person skilled in the art that the statements made above relating to the order-picking in bags according to the invention can be transferred to the order-picking also according to the invention in containers in baskets and do not have to be repeated again here.

Containers which do not comprise adequate inherent stability to remain in an open position are preferably retained by means of a retention member in the basket.

When such a "container in basket" system is used, in a first step before introduction of items, the containers can each be fitted in the basket or a supply of containers is provided, for example, in the form of rolled-up plastic bags already in the basket, and a container is in each case opened before being filled with the items. After order-picking, the groups of items are emptied out of the basket in the emptying device together with the container. The group of items is thereby completely emptied from the basket.

According to other advantageous embodiments, more than one open container may be arranged in a transport basket.

With the order-picking into the pouches as well as with the order-picking into containers in transport baskets, a plurality of the same, but particularly a plurality of different articles can be combined to form a group of items.

Having a possibility for temporary storage of pouches and baskets with incomplete groups of items is advantageous because the ordered items often cannot all be provided at the same time at the filling stations.

BRIEF DESCRIPTION OF SEVERAL VIEWS OF THE DRAWINGS

The invention is explained in greater detail below with reference to embodiments in connection with the figures, in which:

FIG. 4 shows the pouch from FIG. 2 which is filled in several sequential steps by one and the same filling device with the items of a group of items;

FIG. 6 is a schematic illustration of an order-picking facility having a circulating storage according to another embodiment of the invention;

FIG. 7a shows a pouch suitable for the invention with an opening bracket in one opening phase;

FIG. 7b shows the pouch of FIG. 7a with an opening bracket in another opening phase;

FIG. 7c shows the pouch of FIG. 7a with an opening bracket in yet another opening phase;

FIG. 8a shows another pouch suitable for the invention with a pouch frame in the form of a parallelogram and rollers for a slotted guiding member in the open state;

FIG. 8b shows the pouch of FIG. 8a with a pouch frame in the form of a parallelogram and rollers for a slotted guiding member in the closed state;

FIG. 11 is a side view of a basket suitable for the invention for receiving containers for receiving items, wherein the basket in FIG. 11a is illustrated in a folded-in space-saving position and in FIG. 11b is illustrated in the folded-open position for receiving the container;

FIG. 12 shows a container in the form of a bag with two carrier loops, for use with a basket according to FIG. 11;

FIG. 13 shows a basket according to FIG. 11 which transports an open sack which is filled with items according to FIG. 12; and FIG. 14 shows the filled bag according to FIG. 14 which has been removed from the basket.

DETAILED DESCRIPTION OF THE INVENTION

In the context of the invention, items or articles are generally picked by being selectively combined in suspendedly transported pouches by filling the pouches to form groups of items. A group of items may thereby include various different items, but it may also contain multiples of an item. In an extreme case, a group of items may also consist of only one item or article.

Figure 1:
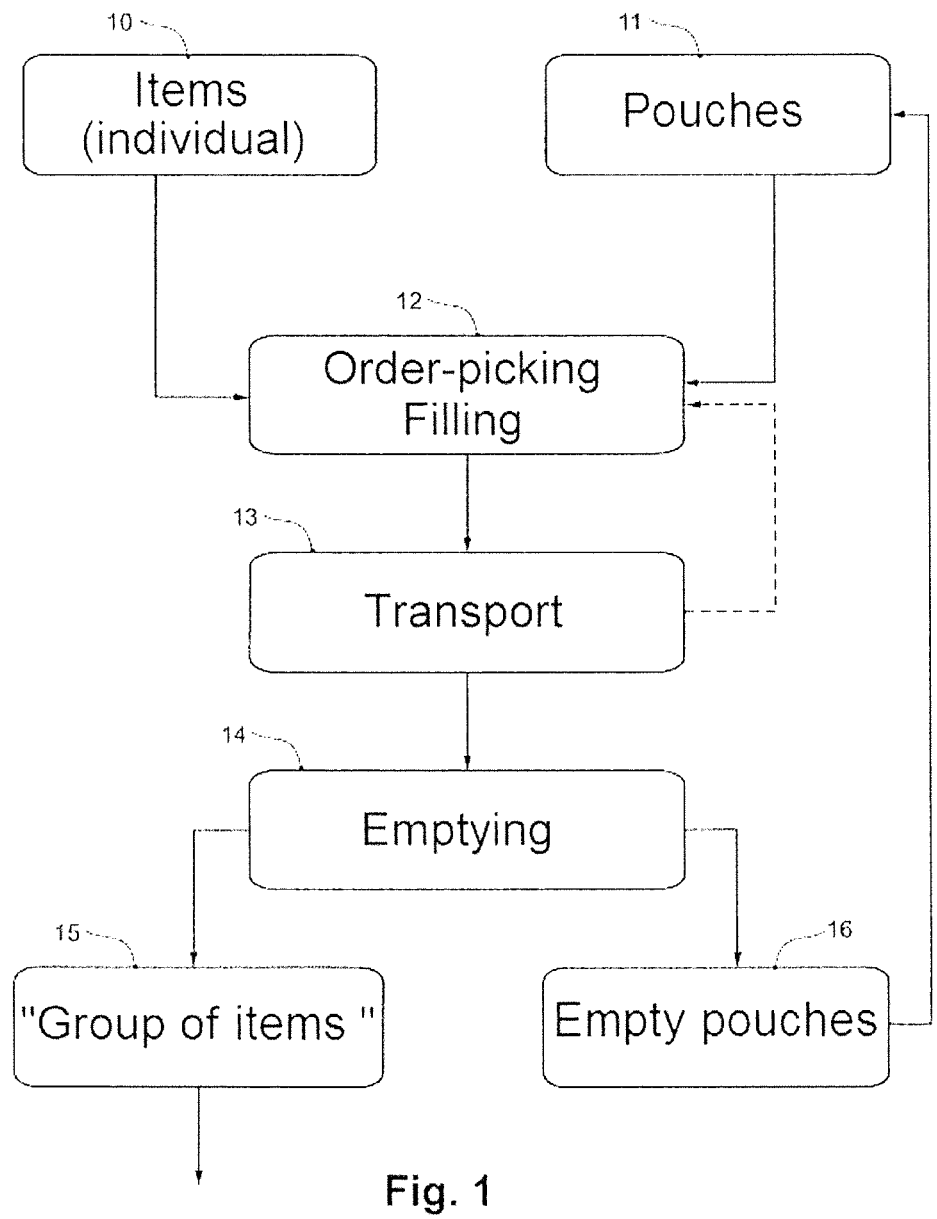
FIG. 1 is a schematic of the sequence during order-picking according to the invention.

FIG. 1 is a schematic of the sequence during order-picking according to the invention. The order-picking process begins with an items removal operation 10 during which the items required for the order-picking are removed individually or also, if the order-picking requires it, several times from an items collection or an item storage, or from an item storage facility, for example a high-bay warehouse, and transported to a location where the actual order-picking and filling operation 12 is carried out. At the same time, pouch provision 11 is carried out, whereby the suspendedly conveyed pouches (empty or partially filled) are likewise transported to the location of the order-picking and filling operation 12.

Figure 2:
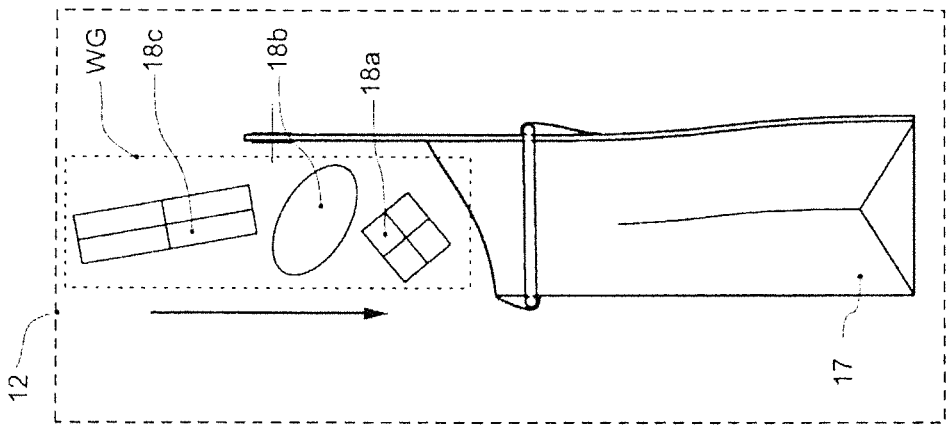
FIG. 2 is an exemplary pouch of a hanging conveyor which is filled in one step with a group of items.

The actual order-picking and filling operation 12 can now be carried out in different ways. In one case (FIG. 2), the group of items WG, which in the example consists of a plurality of different items, 18a-c is picked outside of the pouch 17 and then placed in the pouch 17 in a filling operation.

In another case (FIG. 3), the items 18a-c of the picked group of items are placed in separate filling procedures in the pouch 17 for which purpose separate filling devices 19a-c (indicated in FIG. 3 with an arrow) are used. The filling devices 19a-c are in particular arranged behind each other in the conveying direction along a hanging conveyor (not shown) for the pouches 17, and the pouch 17 is guided by means of the hanging conveyor successively past the filling devices 19a-c and filled there. The filling devices 19a-c may thereby be arranged linearly behind each other and also in a circle.

Figure 3:
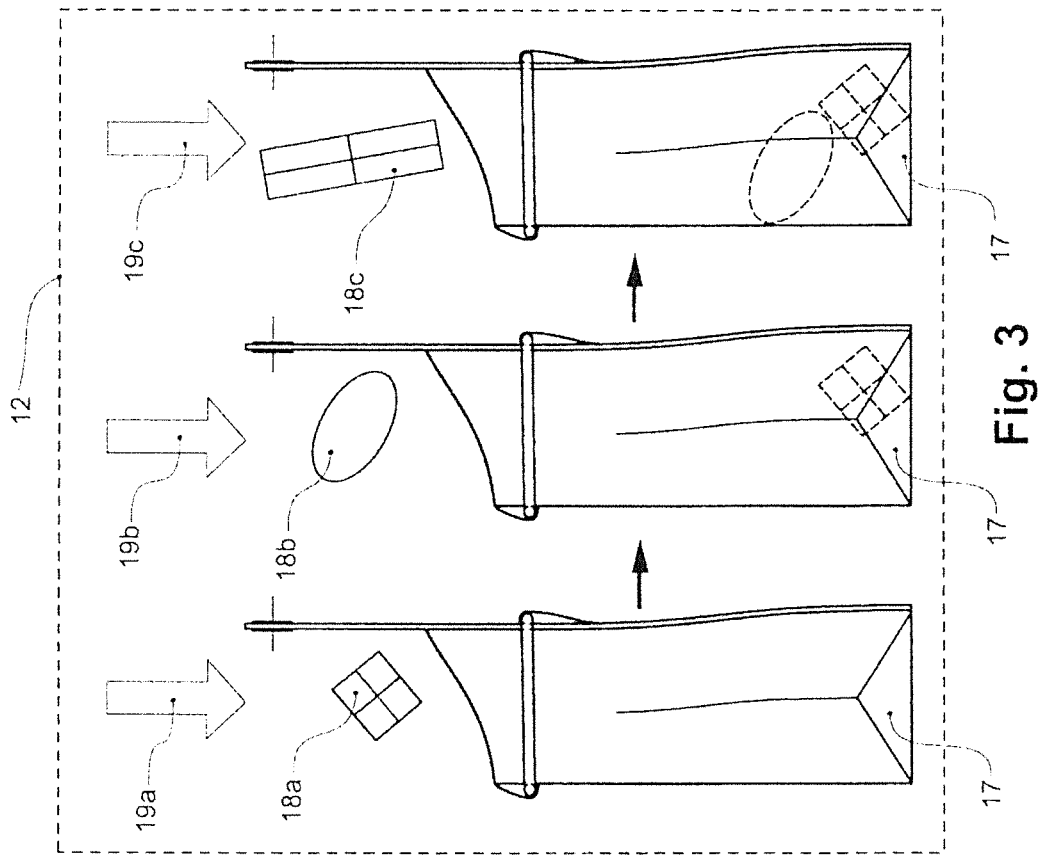
FIG. 3 shows the pouch of FIG. 2 which is filled in several sequential steps by means of different filling devices with the items of a group of items.

In another case (FIG. 4), although the items 18a-c of the picked group of items can also be placed in separate filling procedures one after the other in the pouches, no separate filling devices as in the case of FIG. 3 are used to this end, but instead the filling is carried out using one and the same filling device 19, in that the same pouch 17 is guided in a transport loop multiple times past the filling device 19 and is there filled with one of the items. This case is indicated by the dashed arrow in FIG. 1, which leads from the pouch transport 13 back to the order-picking and filling operation 12 (see also FIG. 5).

Where the pouch is filled with the picked group of items WG during the course of order-picking, it is suspendedly transported, if not temporarily stored, by means of pouch transport 13 on a hanging conveyor to a location where a pouch emptying operation 14 takes place. The group of items WG emptied from the pouches is then, during the course of an item removal 15, released for further processing (for example, dispatch) which may, for example, involve combining to form larger units (for example, for a target region in accordance with postcodes or a recipient) for subsequent transport.

During the course of a pouch return 16, the emptied pouches are conveyed back to the pouch provision 11 for filling again by means of order-picking.

The locations for filling and emptying the pouches are not to be equated with individual loading stations, but instead constitute, for example, conveying paths in which it is possible to order-pick into the pouches by means of a plurality or a multitude of loading stations and/or in which the pouches can be emptied by means of emptying devices. This may, for example, be carried out along an aisle or even in different rooms.

Figure 5:
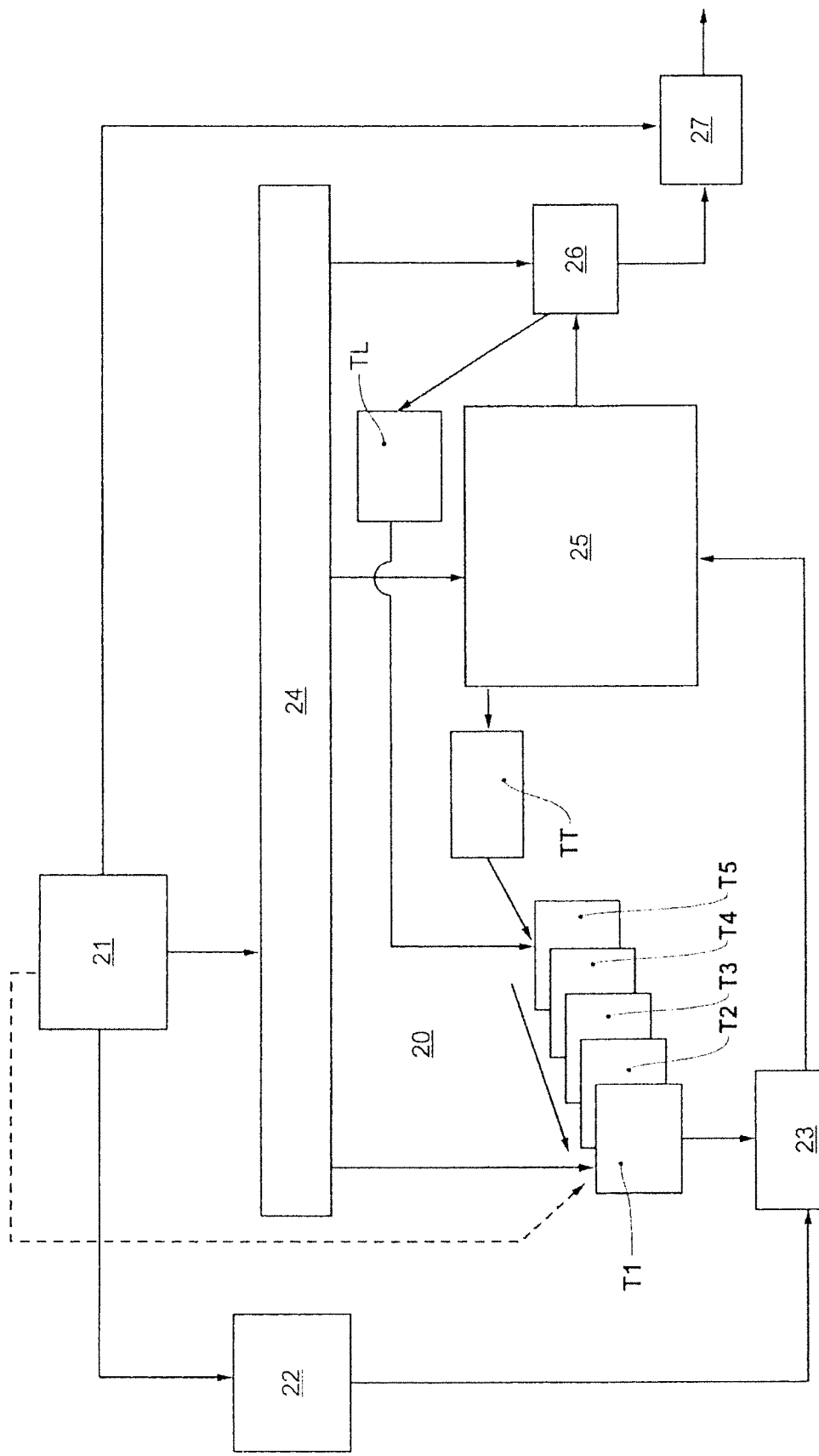
FIG. 5 is a schematic illustration of an order-picking facility according to an embodiment of the invention.

In FIG. 5, an order-picking facility 20 according to an embodiment of the invention is shown in a schematic illustration. In the order-picking facility, items are removed from an items collection 22 and prepared by transferring them to a receiving station configured as a filling device 23. A sorting system 25 operating with a hanging conveyor successively guides pouches T1-T5 (exemplary) to the filling device 23, which are then filled in the filling device 23 with the items according to the order-picking. Depending on the history and type of filling, the pouches T1-T5 may be empty pouches TL that are returned from an emptying device or transfer station 26, or partially filled pouches TT, which during the order-picking for filling with a group of items are supplied one after the other several times in a circuit to the filling device 23. There, they are filled only with individual items or partial quantities of the group of items and are transferred to the emptying device 26 only when completely filled with the picked group of items. An items output 27, which in particular includes the dispatch of the picked items, may be arranged downstream of the emptying device or transfer station 26.

The sorting facility 25 with the hanging conveyor and, in association, providing the empty and/or partially filled pouches TL or TT for filling, along with the emptying device 26, are controlled by a central controller 24 that ensures automatic assignment of groups of items and pouches in addition to their filling and emptying. At a higher level than the controller 24 is an ERP system 21. The ERP system 21, generally tasked with enterprise resource planning (ERP), ensures that, in the manner of material requirement planning, all the items required for the order-picking are available at the correct location, at the correct time and in the correct quantity. This particularly includes providing the items in the items collection 22, collecting the items from the items collection (for example, a high-bay storage) 22, monitoring and directing the controller 24 and transmitting data to the items output 27, which data, if it is an item dispatch, may contain dispatch data, such as an address, weight, postage, box size, etc.

Where the pouches T1-T5 or TT and TL are equipped with optical (for example, barcode) information carriers or information carriers that can be electromagnetically read in or read out (for example, RFID), the ERP system 21 can also coordinate or adjust the pouch content (the picked groups of items) in accordance with the information content of the information carriers (dashed arrow in FIG. 5).

FIG. 6 shows, in a schematic illustration, an order-picking facility with a circulating storage according to another embodiment of the invention. The order-picking facility 30 is again based on an items collection 28, from which the items intended for picking are collected by means of a collection device 29 and then separated in a separation station 31 and individually transported onward to a distribution station 32. A circulating storage 35 including a large number of storage units S1-Sx of the same-type operating in parallel is connected to the distribution station 32. In each storage unit Sx, a closed circuit with a hanging conveyor 59 is provided whose length is increased by meandering design such that a large number of empty, partially filled or filled pouches can circulate therein.

In the upper region of each storage unit Sx, a filling device 33 is provided in which the picked items can be filled into corresponding pouches of the storage unit Sx via the distribution station 32. The filling device 33 may be avoided with an auxiliary conveyor path 34 in the manner of a bypass. The auxiliary conveyor path 34 is (reversibly) used when pouches shall be moved on without filling during the circulation of the storage unit (because a subsequent pouch is just about to be filled), or when a pouch returned from a shared emptying device 26 shall be moved on the return path past specific storage units S1-Sx arranged one after the other.

The storage units S1-Sx in particular serve to pick "for stock" (or to keep empty pouches on stand-by), meaning that when no or only a few picked items are output, pouches in the storage units S1-Sx are filled with picked items or articles which are supplied only at a later time to the at least one emptying device 26 and which are then emptied at that location as part of an items output. The storage units S1-Sx are for this purpose connected via a shared discharge path (having a hanging conveyor 59) to the emptying device 26.

The hanging conveyor 59 also transports the emptied pouches back to the storage units, whereby, when the target storage unit is arranged further back in the conveying direction, the storage units in front are passed on the auxiliary conveying path 34.

Within the framework of the present invention, various types of pouches are considered as suspendedly conveyed pouches. Two examples are shown in FIGS. 7 and 8, wherein the section figures show the respective pouch in different opening states. These pouches are particularly suitable for sorting and distribution tasks of the items or groups of items.

The pouch Ta of FIG. 7 is distinguished in that the bag-like pouch body 38 fitted at the bottom to a suspension fitting 36 is surrounded in the upper region, which at the same time includes the opening, by a bracket member 37 supported on the front and rear side of the pouch member 38 in loops in such a manner that, as a result of gravity, it tilts (FIG. 7(*b*)) from a horizontal opening position (FIG. 7(*c*)) and thereby increasingly folds the pouch member 38 together until it takes up only little space in the closed final position (FIG. 7(*a*)). A behavior of this kind is particularly advantageous when a large number of empty pouches have to be kept on stand-by for order-picking while at the same time having the smallest possible space requirement.

The pouch Tb of FIG. 8 shows a similar behavior in that, as a result of a foldable pouch frame 39 in the form of a parallelogram, the filled pouch (FIG. 8(*a*)) independently progresses into a flat configuration following emptying (FIG. 8(*b*)). The pouch frame 39 additionally affords the possibility of providing rollers 40, 41 at preferred corners, which rollers are advantageous during filling and emptying by means of a sliding guide (see FIG. 10).

Other types of pouches which can also be used in the context of the invention and which are open at the sides are known, for example, from the document WO2016/120030A1 or WO2016/120031A1.

Figure 9:
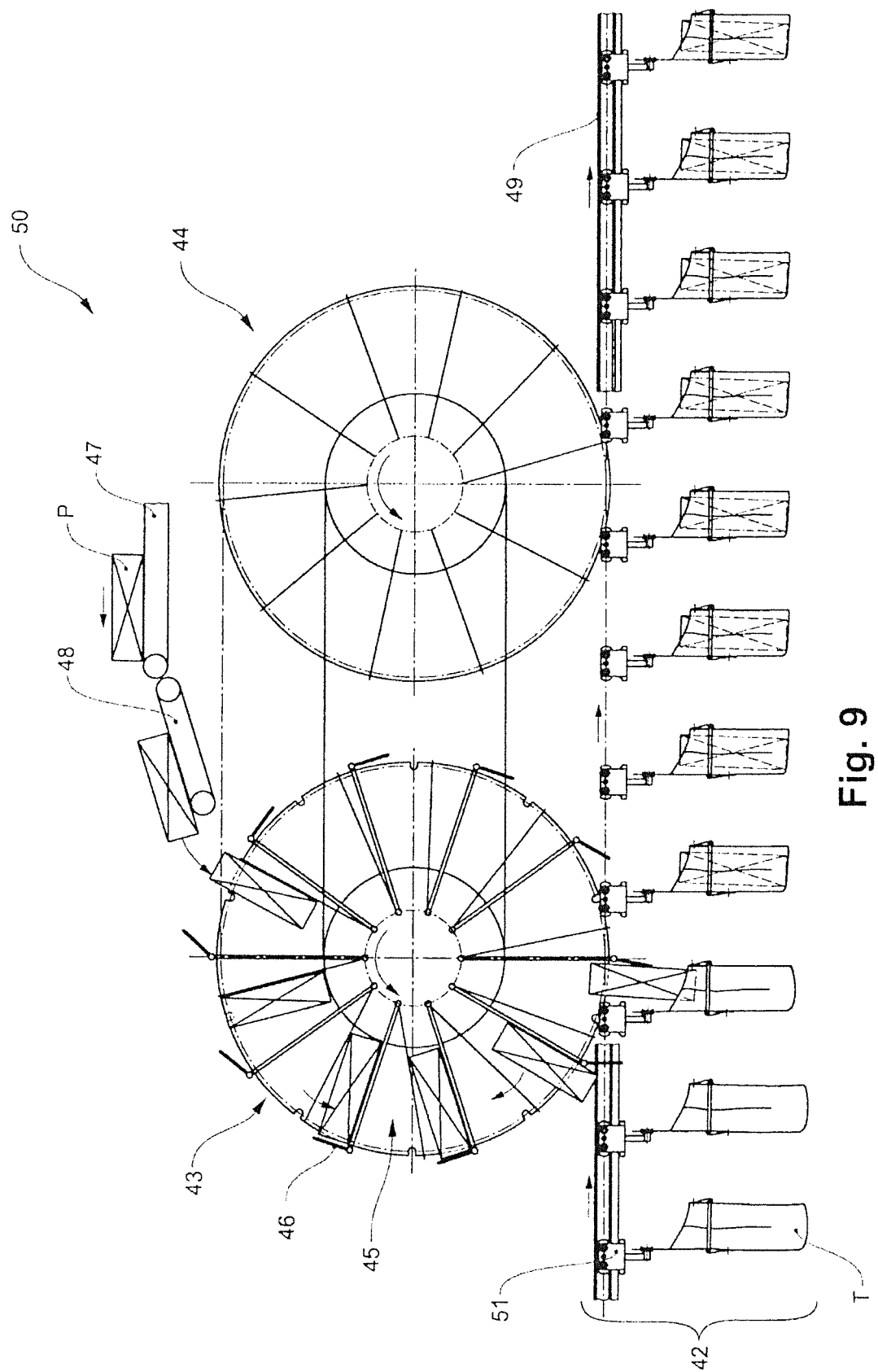
FIG. 9 shows the main elements of a filling device by means of which in the context of the invention the picked items can be continuously placed in the pouches which are suspended on a hanging conveyor.

FIG. 9 shows the main elements of a filling device 50, by which, in the context of the invention, the picked items can be continuously placed in the pouches T suspended on a hanging conveyor 42. The hanging conveyor 42 comprises a running rail 49 extending in the conveying direction and on which individual carriages 51 are displaceably supported and retained in the conveying direction. On each of the carriages a pouch T, which according to FIG. 7 is equipped with a bracket member, is suspendedly fixed. The running rails 49 and carriages 51 may have the same form, as known from the documents WO2016/030275A1, WO2016/030274A1 and WO2016/030273A1.

Above the horizontally extending hanging conveyor 42, there is arranged a filling device 43 which moves synchronously with the hanging conveyor 42 and which along its circumference is sub-divided into sectoral filling compartments 45. These filling compartments 45 may each receive an item, in this example a parcel P, which in the contact area between the filling device 43 and hanging conveyor 42 is taken from the filling compartment and placed into the open pouch T moving underneath.

The items P are introduced into the filling device 43, at the upper apex of the drum by means of two adjacent interconnecting conveyor belts 47 and 48. So that the items located in the filling compartments 45 cannot slide in an undesirable manner out of the filling compartments 45 when the device is further rotated, filling flaps 46 are pivotably articulated at the open end of the filling compartments 45 which in the pivoted-in state prevent the items from sliding out, but which are then pivoted out in order to transfer the items to the pouch T suspended on the hanging conveyor 42. Other filling devices 44 of the same kind (not indicated in greater detail in FIG. 9) can be arranged in the conveying direction one behind the other in order to realize filling method according to FIG. 3.

Figure 10:
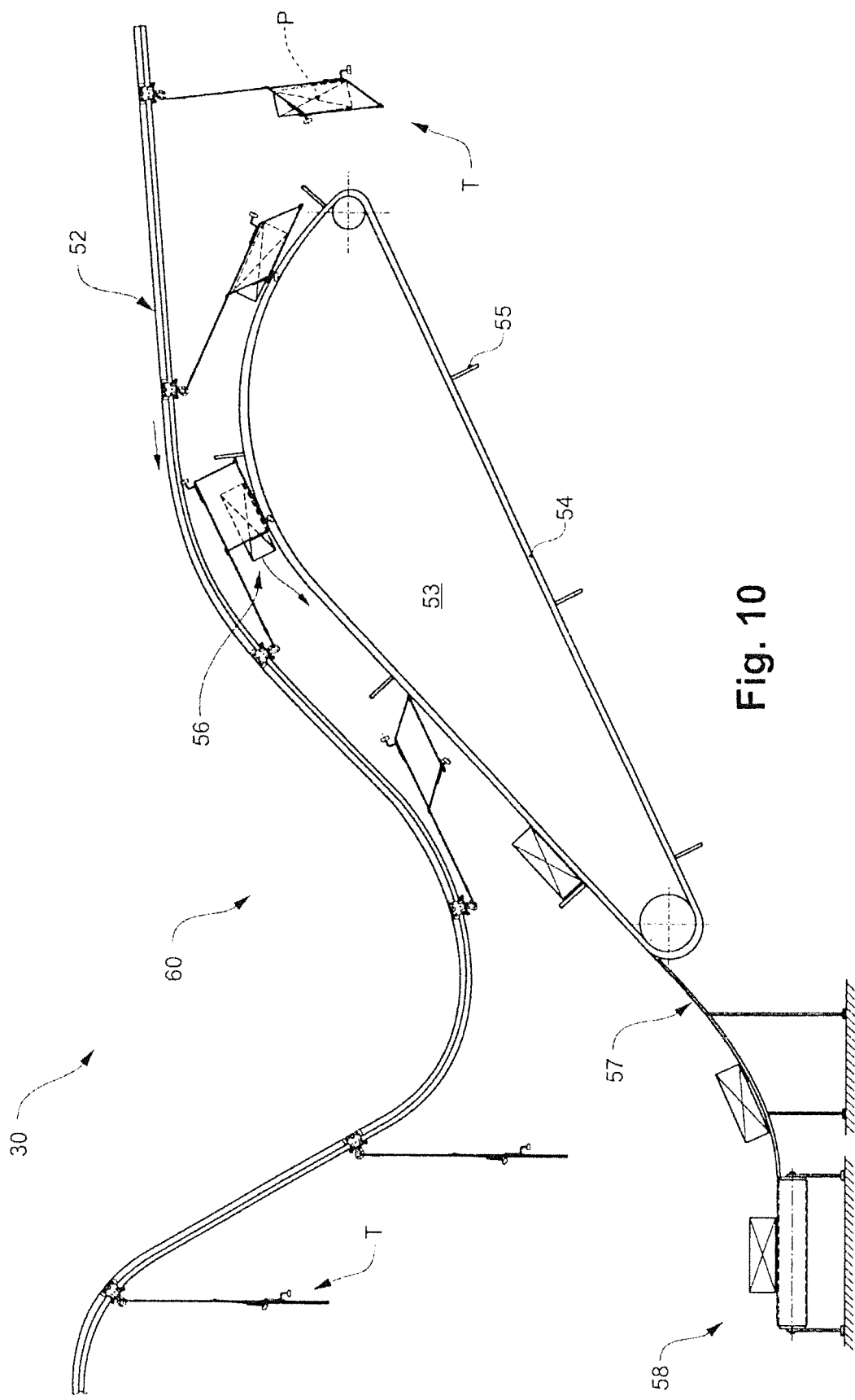
FIG. 10 shows the main elements of an emptying device, by means of which in the context of the invention the picked items can be continuously emptied from the pouches suspended on a hanging conveyor.

FIG. 10 shows the main elements of an emptying device 60 by which, in the context of the invention, the picked items can be continuously emptied from the pouches T suspended on a hanging conveyor 52. The hanging conveyor 52 is to this end guided downward in a bend. In this bend, below the hanging conveyor 52, there is arranged a removal device 53 which includes a circulating removal belt 54 guided over a predetermined path parallel to, and with a fixed spacing to, the hanging conveyor 52. On this stretch of the parallel guide, there results a transfer region 56 for the items P contained in the pouches T, which fall out of the pouches T onto the removal belt 54 and are stopped there by means of retention elements 55 arranged with respective spacing on the removal belt 54. The items P are conveyed with the belt to a lower redirection position, where they are transferred to a subsequent slide 57.

The arrangement and the cooperation of the hanging conveyor 52 and removal belt 54 result in the (filled) pouches T suspended on the hanging conveyor 52 being pivoted upward in a backward direction from the vertically suspended position until they assume a position at the transfer region 56 in which the upper opening of the pouch faces obliquely downward and allows the item P located in the pouch to fall out of the pouch by gravity.

After the transfer onto the slide 57, the item P falls onto a transversely arranged belt conveyor 58 which supplies the item to a further processing operation (not specified in greater detail).

For reasons of simplicity, the group of items picked in the pouch T is indicated in FIGS. 9 and 10 by a single parcel P. It is self-evident that this is a special case of order-picking and that generally the group of items of a pouch includes a plurality of mostly different items.

FIG. 11 is a side view of a basket 80 which according to another embodiment of the invention is advantageously used with containers such as transport bags or sacks. Such a container in the form of a sack 90 is illustrated in FIG. 12. Similar to the pouches shown in FIG. 8 as a result of a foldable compartment or grid frame 81 in the form of a parallelogram, the basket 80 can be moved from a flat configuration, as illustrated in FIG. 11*a*, to a folded-open configuration according to FIG. 11*b*. A stop 82 stabilizes the compartment or grid frame 81 in the open position and prevents folding together by gravity. Rollers may in turn be provided at preferred corners, which rollers are advantageous during filling and emptying by means of a sliding guide.

In the folded-open basket according to FIG. 11*b* in a step upstream of the filling operation, a sack 90 can be introduced, as illustrated in FIG. 12. The sack 90 comprises sufficient inherent stability to remain in the basket in an open configuration. Two carrier loops 92 arranged at the upper side on the opposing side walls of the sack 90 facilitate the removal of the sack 90 filled with items 18*a*-18*c* from the basket 80, as illustrated in FIG. 13.

Following removal of the filled sack 90, as illustrated in FIG. 14, the sack can be further processed together with the items 18*a*-18*c*, preferably supplied to the ordering party or the consumer of the items. Advantageously, the sack carries a label which is provided with an identifier facilitating further processing and/or delivery. The sack may, for example, be provided with an address label and/or carry a list of the items 18*a*-18*c* intended for filling. Such a label, not illustrated in the figures, may be configured to be optically and/or electronically imprinted, written to and readable. In order to configure the identifier of the sack in the basket as simply as possible, the label according to an advantageous embodiment is configured as an RFID tag.

If loose containers such as textile or film bags are used together with the baskets, it has been found advantageous to arrange a plurality of flaps at the upper side of the bags which can be suspended on suitable retention members of the baskets. If the flaps are to be avoided, the upper bag edge can be retained in a clamping manner on suitable retention members of the basket or placed over the upper edge of the basket.

The containers in which the items to be dispatched remain after the order-picking can preferably be closed at the upper side.

The invention claimed is:

1. An order-picking facility (20, 30) wherein the order-picking facility (20, 30) comprises:
    at an input side an items collection (22, 28) having items (18a-c) intended for picking, and at least one adjacent filling device (19, 19a-c, 23, 33, 50) for pouches (17, T, T1 -T5, Ta, Tb) and/or baskets 80;
    at an output side an emptying device (26, 60) for the pouches (17, T, T1-T5, Ta, Tb) or baskets 80 that are filled with the groups of items (WG); and
    between the at least one filling device (19, 19a-c, 23, 33, 50) and the emptying device (26, 60) there is arranged a hanging conveyor (25, 42, 52, 59) for the pouches (17, T, T1-T5, Ta, Tb) and/or baskets 80 which connects the at least one filling device (19, 19a-c, 23, 33, 50) to the emptying device (26, 60) which is configured to fill the items into a container arranged in the pouch (17, T, T1-T5, Ta, Tb) or basket (80), wherein a group of items (18a, 18b, 18c) is filled into one container (90) or divided across several containers (90).

2. The order-picking facility as claimed in claim 1, wherein the order-picking facility (50) includes at least one filling device (43, 44) which moves along the hanging conveyor (42) which is guided past underneath and fills items (P) from moved filling compartments (45) into the pouches (T) or baskets 80 which are moved past underneath.

3. The order-picking facility as claimed in claim 1, wherein the emptying device (60) includes a removal device (53) which pivots the filled pouches (T) or baskets 80 suspended on the hanging conveyor (52) into an emptying position and at the same time in the emptying position receives the items (P) coming out of the pouches (T) or baskets 80 and transports the items onward.

4. The order-picking facility as claimed in claim 3, wherein the removal device (53) includes a circulating removal belt (54) which is guided over a predetermined path parallel to the hanging conveyor (52), on which path a transfer region (56) for the items (P) contained in the pouches (T) or baskets (80) is located.

5. The order-picking facility as claimed in claim 1 wherein the combination of the items to form groups of items is effected into a container (90), a bag, or a sack, into the baskets (80) suspended on the hanging conveyor.

6. The order-picking facility as claimed in claim 5, wherein the container is held in an open state in the basket by a retention member.

7. The order-picking facility as claimed in claim 1, wherein the hanging conveyor (25, 42, 52, 59) connects the at least one filling device (19, 19a-c, 23, 33, 50) to the emptying device (26, 60) in a closed circuit.

8. The order-picking facility as claimed in claim 7, wherein the hanging conveyor (25, 42, 52) is guided past a plurality of filling devices (19a-c) arranged one behind an other.

9. The order-picking facility as claimed in claim 7, wherein the hanging conveyor (25) comprises an additional closed circuit on which partially filled pouches (TT) or baskets 80 are returned again to the at least one filling device (19, 19a-c, 23, 33, 50) without being emptied in the emptying device (26, 60).

10. The order-picking facility as claimed in claim 7, wherein the hanging conveyor (25) is configured as a circulating storage (35) in which filled and/or partially filled and/or empty pouches and/or baskets 80 can be temporarily stored.

11. The order-picking facility as claimed in claim 10, wherein the circulating storage (35) comprises a plurality of storage units (S1-Sx) which can be approached individually one after an other and in which filled and/or partially filled and/or empty pouches and/or baskets 80 circulate in a separate circuit.

12. The order-picking facility as claimed in claim 1, wherein a shared controller (24) is provided for the controller of the filling device (19, 19a-c, 23, 33, 50), emptying device (26, 60) and hanging conveyor (25, 42, 52, 59).

13. The order-picking facility as claimed in claim 12, wherein the shared controller (24) is configured to assign the items (18a-c) of a group of items (WG) to individual or a plurality of pouches or baskets 80.

14. The order-picking facility as claimed in claim 12 wherein the shared controller (24), in order to transmit order-picking data, in particular data of the groups of items, is connected to an ERP system (21).

15. A method for order-picking items (18a-c) comprising:
    removing individual items (18a-c) from an items collection (22, 28);
    combining individual items (18a-c) into groups of items (WG) in accordance with specifications and output in the form of these groups of items (WG) for further processing;
    effecting the combination of the items (18a-c) into groups of items (WG) into pouches (17, T, T1-T5, Ta, Tb) or baskets 80 suspended on a hanging conveyor (42, 52, 59); and
    filling the items into a container arranged in the pouch (17, T, T1-T5, Ta, Tb) or basket (80), wherein a group of items (18a, 18b, 18c) is filled into one container (90) or divided across several containers (90).

16. The method as claimed in claim 15, wherein at least one individual pouch (17, T, T1-T5, Ta, Tb) or an individual basket 80 is assigned to each group of items (WG).

17. The method as claimed in claim 15, wherein at least one pouch (17, T, T1-T5, Ta, Tb) or at least one basket 80 is filled with a group of items (WG) comprising a plurality of items (18a-c).

18. The method as claimed in claim 15, wherein the groups of items (WG) are placed in the pouches (17, T, T1-T5, Ta, Tb) or baskets 80 provided for them in a single filling operation.

19. The method as claimed in claim 15, wherein the group of items contains multiples of one item (18a-c).

20. The method as claimed in claim 15, wherein, in a first step prior to being filled with items (18a, 18b, 18c), the container (90) is introduced into a pouch (17, T, T1-T5, Ta, Tb) or basket (80), and subsequently filled.

21. The method as claimed in claim 15, wherein a plurality of containers are located in the pouch (17, T, T1-T5, Ta, Tb) or basket (80) and a container in a first step prior to being filled with items (18a, 18b, 18c) is opened and subsequently filled.

22. The method as claimed in claim 15, wherein the group of items (18a, 18b, 18c) is emptied together with the container(s) (90) out of the basket (80).

23. The method as claimed in claim 15 wherein the pouches (17, T, T1-T5, Ta, Tb) or baskets 80 are completely emptied of the contained groups of items (WG).

24. The method as claimed in claim 15, wherein, in a plurality of successively carried out filling operations, the items (18a-c) belonging to a group of items (WG) are filled into the provided pouches (17, T, T1-T5, Ta, Tb) or baskets 80, and the group of items (WG) is formed.

25. The method as claimed in claim 24, wherein an individual filling operation is carried out for each individual item (18a-c).

26. The method as claimed in claim 24 wherein the pouch (17, T, T1-T5, Ta, Tb) or basket 80 for filling is guided one after the other past different filling devices (19a-c, 43, 44).

27. The method as claimed in claim 24 wherein the pouch (17, T, T1-T5, Ta, Tb) or basket 80 is guided past the same filling device (19) multiple times for filling.

28. The method as claimed in claim 15 wherein the pouches (17, T, T1-T5, Ta, Tb) or baskets 80, after being filled with the provided group of items (WG), are first stored temporarily before the groups of items (WG) contained therein are output for further processing.

29. The method as claimed in claim 28, wherein the filled pouches (17, T, T1-T5, Ta, Tb) or baskets 80 are temporarily stored in a circulating storage (35) in which they each circulate in a closed circuit.

30. The method as claimed in claim 29, wherein the filled pouches (17, T, T1-T5, Ta, Tb) or baskets 80 in the circulating storage (35) are divided across different storage units (S1-Sx) based on content.

* * * * *